United States Patent Office 3,313,168
Patented Apr. 11, 1967

3,313,168
IDLER FOR BELT CONVEYORS
Edmund W. Matthews, Hallow, England, assignor to The Mining Engineering Company Limited, Worcestershire, England, a British company
Filed Feb. 1, 1965, Ser. No. 429,229
Claims priority, application Great Britain, Feb. 21, 1964, 7,259/64
1 Claim. (Cl. 74—230.3)

This invention relates to improvements in idlers for belt conveyors and is especially but not exclusively concerned with heavy duty idlers.

Ordinary duty idlers are usually iron castings and give good results but, for various reasons, this form of construction is ruled out for heavy duty idlers which have to be of large size.

The invention is concerned with idlers of the metal tube-metal end ring design and solves the problem of securing the tube to its end rings. In the case of return rollers of similar design the end rings may be simply pressed into the tube, but this isn't really satisfactory for the idlers themselves because of the much heavier duty demanded of the idlers.

The present invention consists in an idler consisting of a metal tube with its ends closed by metal rings, the rings being an interference fit in the tube and the tube and the rings being formed with radially extending portions which overlap at normal temperature to ensure positive retention of the rings.

Two embodiments of the invention will now be described by way of example with reference to the accompanying drawings in which.

Figure 1:
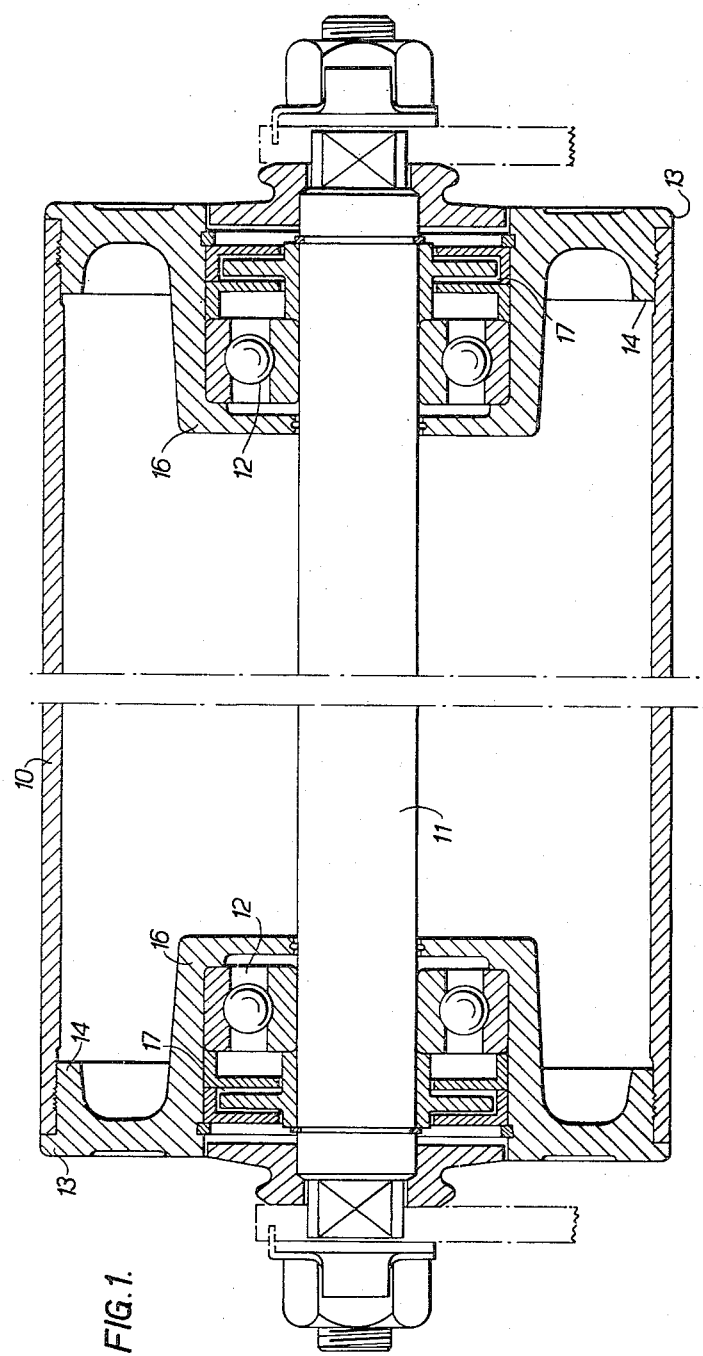
FIGURE 1 is a longitudinal section of an idler in accordance with the invention.
Figure 2:
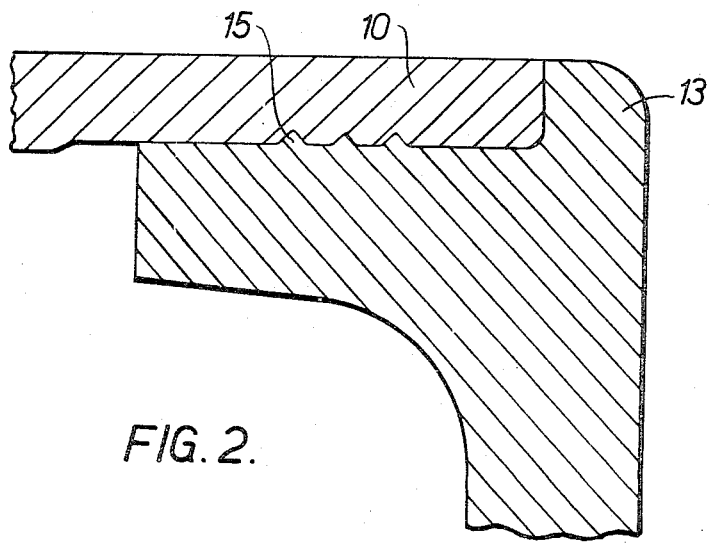
FIGURE 2 is a view on a larger scale of the joint between the ring and the tube.

As shown in FIGURE 1, the idler consists of a cylindrical steel shell 10 supported on a spindle 11 by bearings 12 which are housed in iron rings fitted into the ends of the shell. Each ring has a flange 13 which abuts the adjacent end of the tube. The spigot 14 of the ring has three external circular ribs 15 which fit into three grooves in the tube. The spigot is an interference fit in the tube at normal temperatures. The insertion of the spigot is achieved by expanding the shell. The ring includes a housing 16 for the bearing and a labyrinth seal 17. The housing is closed by the end cap.

Figure 3:
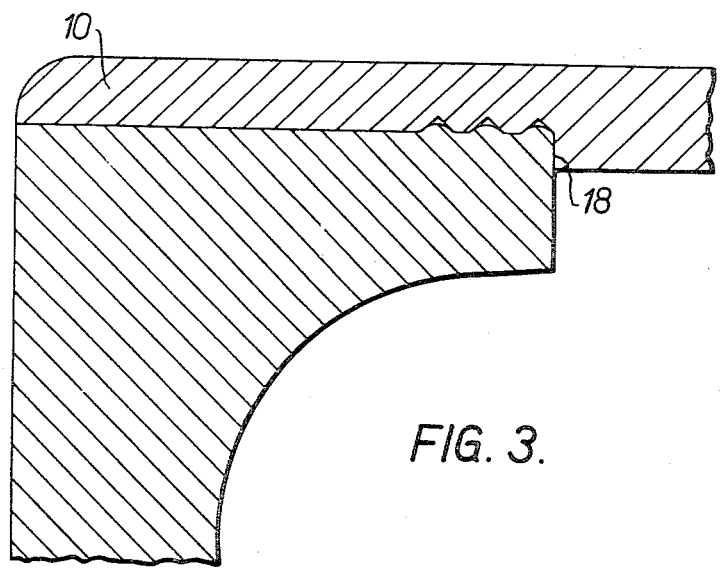
FIGURE 3 is a view similar to FIGURE 2 of another embodiment.

FIGURE 3 shows another embodiment in which the ring abuts an internal shoulder 18 in the tube.

Preferably, the ribs and grooves are also an interference fit at normal temperatures.

I claim:

An idler roller for a belt conveyor comprising a radially expansible metal tube, metal end rings in opposite ends of said tube and adapted for mounting the roller on a spindle, and a plurality of radially extending preformed annular ribs and grooves on the outer surface of each end ring and the inner surface of the tube, said ribs and grooves being constructed and arranged that upon expansion of said tube each ring is engageable with said tube without substantial interference between said preformed ribs and grooves on said ring and tube, said ribs and grooves interengaging each other in overlapping relationship at normal temperatures to provide a mechanical interference fit to lock each ring to said tube when the latter is in an unexpanded condition.

References Cited by the Examiner
UNITED STATES PATENTS

| | | | |
|---|---|---|---|
| 1,018,457 | 2/1912 | Vieser | 74—230.3 X |
| 1,499,920 | 7/1924 | Godden | 74—230.3 X |
| 2,429,293 | 10/1947 | Peck et al. | 74—230.3 X |
| 2,692,773 | 10/1954 | Lorig. | |
| 3,074,288 | 1/1963 | Newton | 74—230.3 |
| 3,100,333 | 8/1963 | Friend. | |

FOREIGN PATENTS 462,785    3/1937    Great Britain.

DAVID J. WILLIAMOWSKY, Primary Examiner.
J. A. WONG, Assistant Examiner.